(12) United States Patent
Boulanger et al.

(10) Patent No.: US 10,473,849 B2
(45) Date of Patent: Nov. 12, 2019

(54) LIGHTING ARRANGEMENT

(71) Applicant: CP IP Holdings Limited, Central Hong Kong (CN)

(72) Inventors: Dave Boulanger, Hong Kong (CN); Maciej Nowakowski, West Vancouver (CA)

(*) Notice: Subject to any disclaimer, the term of this patent is extended or adjusted under 35 U.S.C. 154(b) by 193 days.

(21) Appl. No.: 15/674,730

(22) Filed: Aug. 11, 2017

(65) Prior Publication Data
US 2018/0045880 A1 Feb. 15, 2018

Related U.S. Application Data (60) Provisional application No. 62/374,782, filed on Aug. 13, 2016.

(51) Int. Cl.
*F21S 8/04* (2006.01)
*F21V 8/00* (2006.01)
(Continued)

(52) U.S. Cl.
CPC .............. *G02B 6/0088* (2013.01); *F16B 2/22* (2013.01); *F21S 8/04* (2013.01); *F21V 17/10* (2013.01);
(Continued)

(58) Field of Classification Search
CPC ........ F21V 21/03; F21V 21/02; F21V 23/003; F21V 17/108; F21V 17/12; F21V 17/14;
(Continued)

(56) References Cited

U.S. PATENT DOCUMENTS 2,433,819 A * 12/1947 Scribner ................. F21V 21/02
248/343
2,893,671 A * 7/1959 Flora ....................... F16B 5/125
403/380
(Continued)

FOREIGN PATENT DOCUMENTS

EP 0040051 B1 12/1983
EP 0829650 A1 9/1997
(Continued)

OTHER PUBLICATIONS

European Patent Office; Communication under Rule 71(3) EPC, Decision to Grant corresponding European Application; dated Mar. 26, 2019; 7 pages.
(Continued)

*Primary Examiner* — Anh T Mai
*Assistant Examiner* — Fatima N Farokhrooz
(74) *Attorney, Agent, or Firm* — Black, McCuskey, Souers & Arbaugh LPA (57) ABSTRACT

A lighting arrangement can include a light panel, a bracket, and a connecting member. The light panel can include a frame and a plurality of light emitting units. The bracket can be mountable on at least one of a wall and a ceiling. The frame of the light panel and the bracket can be selectively engageable with one another through movement of the light panel relative to the bracket along a path of movement in a direction between first and second positions. The connecting member can be fixedly engaged to the light panel or the bracket. The connecting member can be configured to interconnect the light panel and the bracket and to accumulate energy during movement of the frame along the path wherein the accumulated energy is at least partially released upon the light panel reaching the second position.

20 Claims, 12 Drawing Sheets

US 10,473,849 B2
Page 2

(51) Int. Cl.
| | |
|---|---|
| *F21V 17/10* | (2006.01) |
| *F16B 2/22* | (2006.01) |
| *F21V 21/088* | (2006.01) |
| *F21V 21/03* | (2006.01) |
| *F21Y 115/10* | (2016.01) |
| *F21V 23/00* | (2015.01) |
| *F21Y 103/10* | (2016.01) |

(52) U.S. Cl.
CPC ............ *F21V 21/03* (2013.01); *F21V 21/088* (2013.01); *G02B 6/009* (2013.01); *G02B 6/0051* (2013.01); *F21V 23/003* (2013.01); *F21Y 2103/10* (2016.08); *F21Y 2115/10* (2016.08); *G02B 6/0011* (2013.01)

(58) Field of Classification Search
CPC ........ F21V 17/16; F21V 21/088; F21V 17/10; Y10T 403/606; Y10T 403/61; Y10T 403/7092; Y10S 248/906; F21S 8/04; F16B 2/22; G02B 6/009; G02B 6/0011; G02B 6/0088; G02B 6/0051; F21Y 2115/10; F21Y 2103/10
See application file for complete search history.

(56) References Cited

U.S. PATENT DOCUMENTS

| | | | | |
|---|---|---|---|---|
| 2,973,175 | A * | 2/1961 | Appleton | H02G 3/125 248/27.1 |
| 3,127,145 | A * | 3/1964 | McGinty et al. | F21V 21/04 220/3.9 |
| 4,457,249 | A * | 7/1984 | Disen | B63B 3/09 114/356 |
| 4,562,656 | A * | 1/1986 | Kristofich | A47G 1/065 16/235 |
| 5,176,462 | A * | 1/1993 | Chen | A47F 5/105 403/252 |
| 5,526,553 | A | 6/1996 | Klein | |
| 5,715,563 | A * | 2/1998 | Marks | B60S 1/4003 15/250.32 |
| 6,293,510 | B1 * | 9/2001 | Bradford | F21V 17/107 248/317 |
| 6,371,630 | B1 * | 4/2002 | Unger | F21V 21/02 362/148 |
| 6,653,558 | B1 * | 11/2003 | Bucher | F21V 21/03 174/50 |
| 8,066,412 | B2 * | 11/2011 | Vann | F21V 21/00 248/342 |
| 8,342,722 | B1 | 1/2013 | Opdahl | |
| 8,376,777 | B2 | 2/2013 | Smith | |
| 9,464,790 | B2 * | 10/2016 | Badley | F21V 19/00 |
| 2002/0118545 | A1 * | 8/2002 | Bucher | F21V 21/03 362/404 |
| 2006/0108137 | A1 * | 5/2006 | Smith | H01R 33/46 174/50 |
| 2008/0245544 | A1 * | 10/2008 | Warren | H02G 3/10 174/50 |
| 2009/0016812 | A1 * | 1/2009 | Wittgrebe | F24C 15/16 403/189 |
| 2009/0321598 | A1 | 12/2009 | Vann et al. | |
| 2011/0236127 | A1 * | 9/2011 | Hirota | F16B 5/0664 403/330 |
| 2014/0021315 | A1 * | 1/2014 | Johnson | A47F 5/0006 248/276.1 |
| 2014/0268825 | A1 * | 9/2014 | Lay | F21V 21/03 362/371 |

FOREIGN PATENT DOCUMENTS

| | | |
|---|---|---|
| EP | 0829650 A1 | 3/1998 |
| EP | 2789907 A1 | 11/2011 |
| EP | 2789907 A1 | 10/2014 |
| EP | 3041319 A1 | 1/2016 |
| EP | 3041319 A1 | 6/2016 |
| KR | 101521945 B1 | 5/2015 |
| TW | 312627 | 5/2007 |
| TW | M312627 U | 5/2007 |
| WO | 2013053768 A1 | 4/2013 |

OTHER PUBLICATIONS

Extended European Search Report issued in corresponding European Application No. 18166978.9; 10 pages.
European Search Report for application No. 17185906.9, dated Oct. 25, 2017, 12 pages.

* cited by examiner

LIGHTING ARRANGEMENT

CROSS-REFERENCE TO RELATED APPLICATIONS

This application claims the benefit of U.S. Provisional Patent Application Ser. No. 62/374,782 for a LIGHTING ARRANGEMENT, filed on Aug. 13, 2017, which is hereby incorporated by reference in its entirety.

BACKGROUND

1. Field

The present disclosure relates to structures that emit light.

2. Description of Related Prior Art

U.S. Pat. No. 8,376,777 discloses a QUICK MOUNTING DEVICE WITH MODULES. The quick mounting device for appliances is alleged to be quickly and easily engaged and disengaged mechanically without the use of tools.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A lighting arrangement can include a light panel, a bracket, and a connecting member. The light panel can include a frame and a plurality of light emitting units mounted on the frame. The bracket can be mountable on at least one of a wall and a ceiling. The frame of the light panel and the bracket can be selectively engageable with one another through one of rectilinear movement and rotational movement of the light panel relative to the bracket along a first path of movement in a first direction between a first position and a second position. The connecting member can be fixedly engaged with at least one of the light panel and the bracket. The connecting member can be configured to interconnect the light panel and the bracket. The connecting member can be configured to accumulate energy during movement of the frame along the first path of movement wherein the accumulated energy is at least partially released upon the light panel reaching the second position.

BRIEF DESCRIPTION OF THE DRAWINGS

The detailed description set forth below references the following drawings.

DETAILED DESCRIPTION

Referring now to the Figures generally, a lighting arrangement 10 can include a bracket 12 and a light panel 14. The bracket 12 can be a unitary structure or an assembly of a plurality of structures that are permanently or releasibly interconnected. The exemplary light panel 14 is rectangular in shape, but can be shaped differently in other embodiments of the present disclosure such as square, round, or elliptical.

The bracket 12 can be mountable on at least one of a wall and a ceiling. The bracket 12 can include a spine 16 and a pair of outriggers or spans 18, 118. The spine 16 can be affixed to a wall, a ceiling or directly to a junction box, such as with fasteners. The spans 18, 118 can be affixed to the spine 16 with fasteners. The fasteners interconnecting the spans 18, 118 with the spine 16 can also interconnecting the spans 18, 118 with the ceiling or wall.

Figure 8:
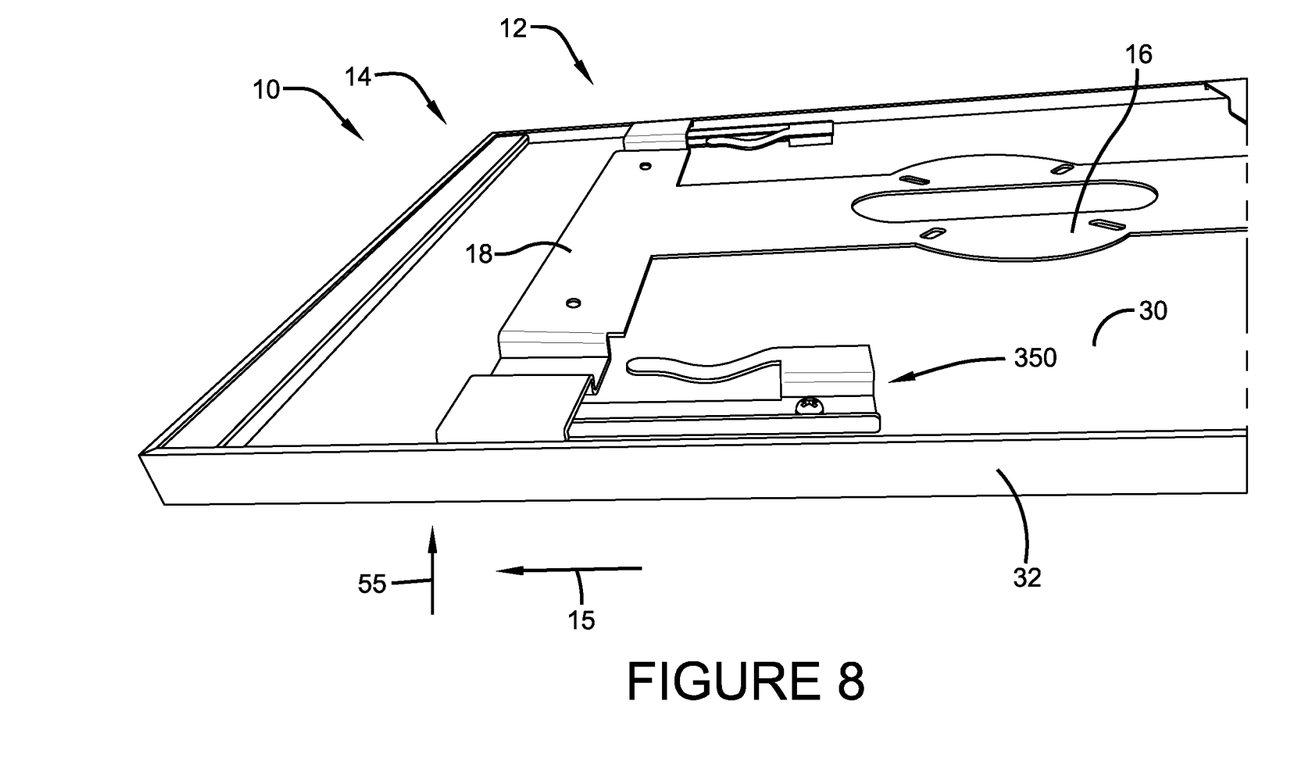
FIG. 8 is a first perspective view of a portion of the top side of the exemplary lighting arrangement with the bracket and light panel coming together for interconnection, wherein the light panel is shown in an exemplary first position.
Figure 10:
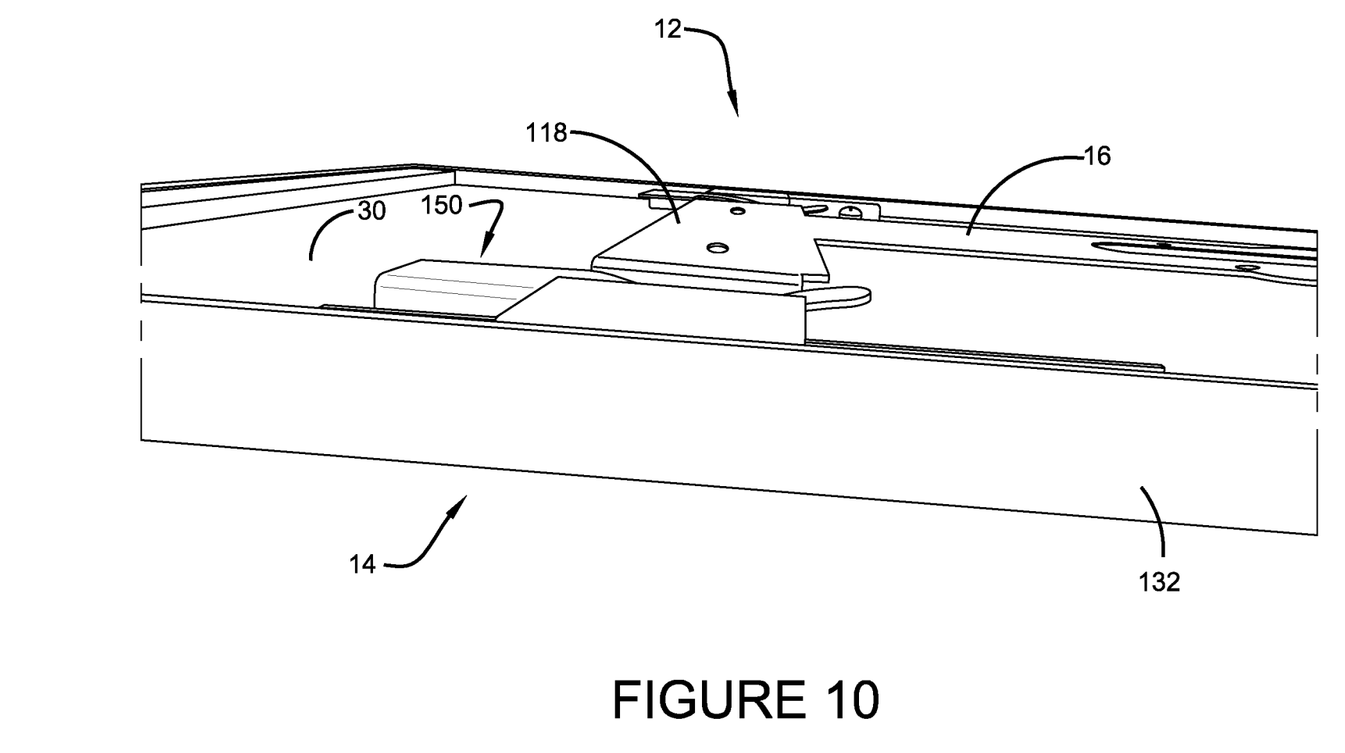
FIG. 10 is a third perspective view of a portion of the top side of the exemplary lighting arrangement with the bracket and light panel having come together and are interconnected, wherein the light panel is shown in an exemplary second position.
Figure 11:
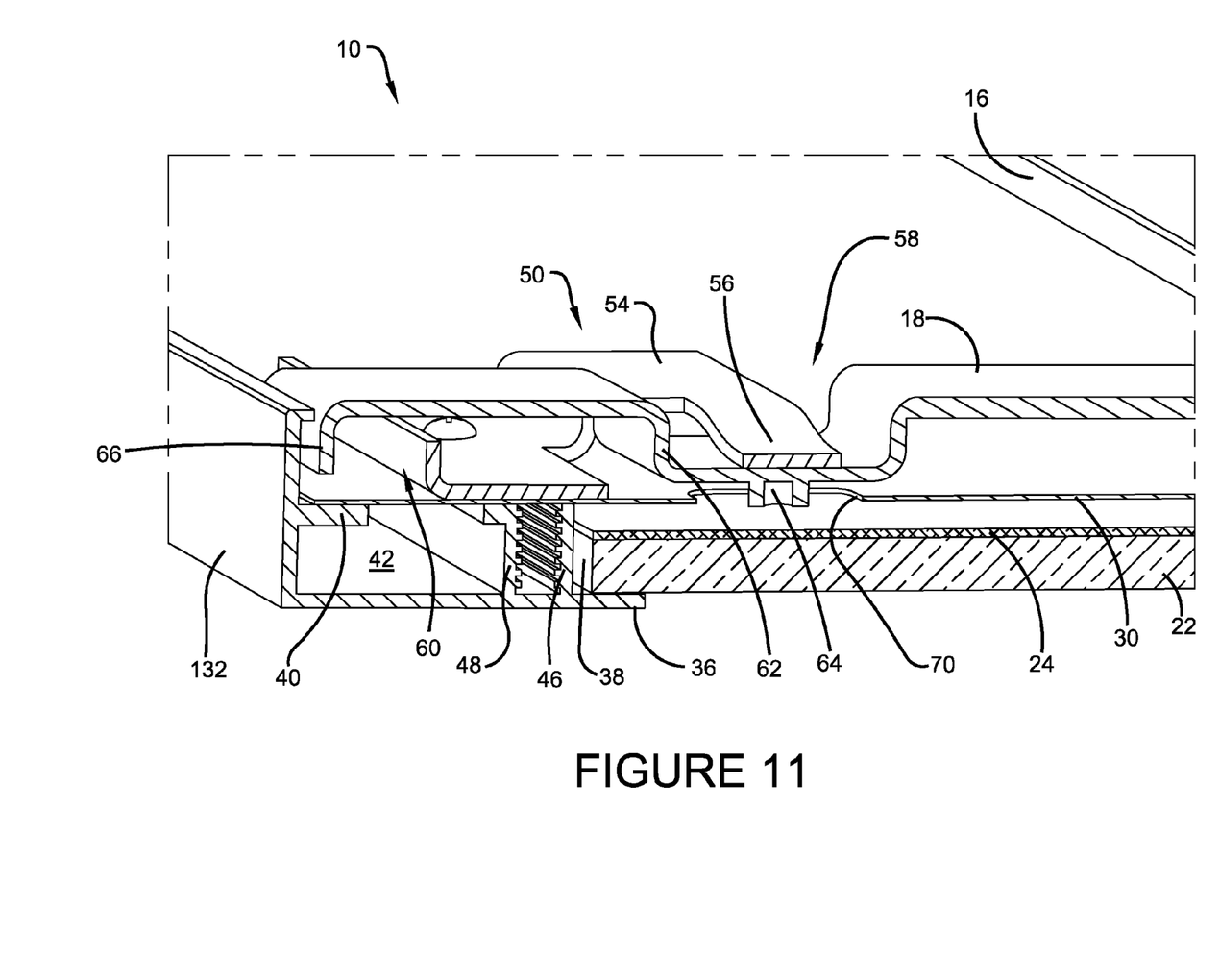
FIG. 11 is a cross-section taken through structures that interconnect the light panel and the mounting bracket when the light panel is in the exemplary second position.
Figure 12:
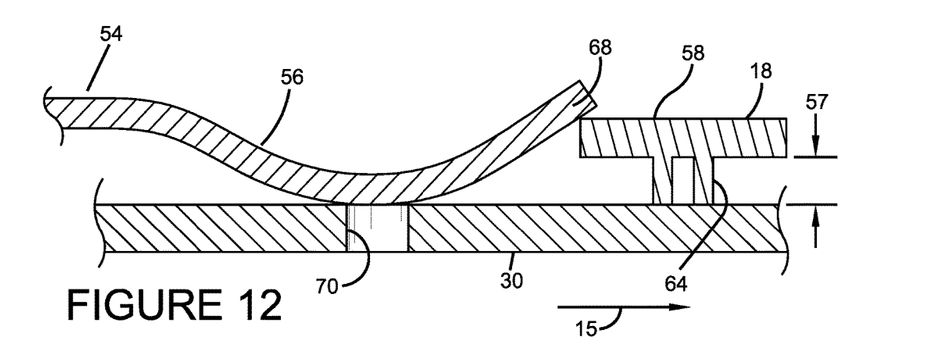
FIG. 12 is a cross-sectional view of the structures that interconnect the light panel and the bracket of the exemplary lighting arrangement prior to full engagement between the light panel and the bracket.
Figure 13:
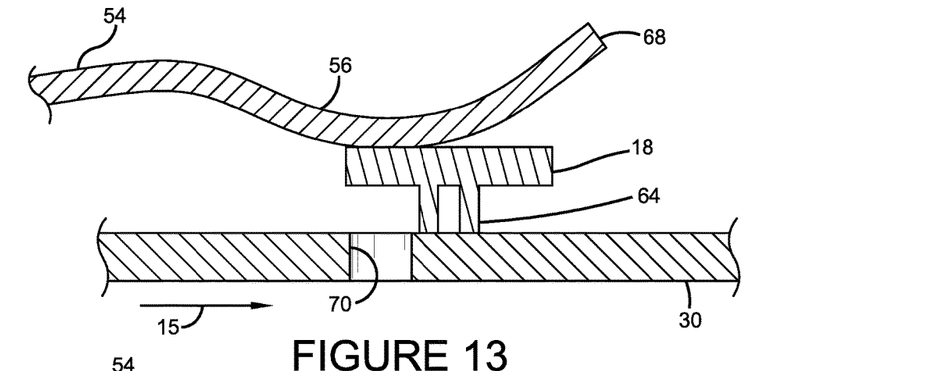
FIG. 13 is a cross-sectional view of the structures that interconnect the light panel and the bracket of the exemplary lighting arrangement during engagement and before full engagement.
Figure 14:
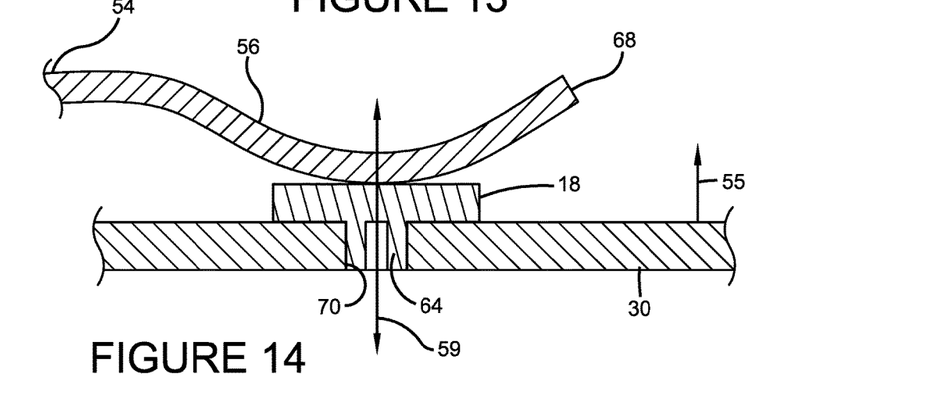
FIG. 14 is a cross-sectional view of the structures that interconnect the light panel and the bracket of the exemplary lighting arrangement upon engagement.

The light panel 14 can include a frame 20, a diffuser 22, a light guide 24 with a backing of reflective paper, a plurality of light emitting units such as light emitting diodes ("LED" or "LEDs") such as LEDs 26, 126, 226 mounted on the frame 20, one or more drivers 28, 128 for the LEDs, and a back cover 30. The frame 20 can be a unitary structure or an assembly of a plurality of structures that are permanently or releasibly interconnected. The frame 20 of the light panel 14 and the bracket 12 can be selectively engageable with one another through one of rectilinear movement and rotational movement of the light panel relative to the bracket along a first path of movement in a first direction between a first position and a second position. In the exemplary embodiment, the light panel 14 can be moved rectilinearly relative the bracket 12 (which can be mounted on a wall or ceiling). FIG. 8 shows the light panel 14 in an exemplary first position. FIGS. 10, 11 and 14 show the light panel 14 in an exemplary second position. FIGS. 12 and 13 show positions in between the first and second positions along the first path of movement. The exemplary first direction of movement is referenced by arrow 15. The exemplary first path of movement can be defined as a straight line, such as the straight line followed by any particular point on the light arrangement 10 between the first and second positions. However, in other embodiments of the present disclosure, the first path of movement can be strictly rotational or a combination of rectilinear and rotational motion.

The exemplary frame 20 includes a pair of longitudinal members 32, 132 and a pair of transverse members 34, 134. The members 32, 34, 132, 134 can be affixed together. Each of the members 32, 34, 132, 134 define a lip extending toward the center of the frame 20, such as the lip 36 of the member 132 shown in FIG. 11. The diffuser 22 and light guide 24 can rest on the lips defined by the members 32, 34, 132, 134.

The LEDs, such as LEDs 26, 126, 226, can be arranged in arrays along the members 32 and 132. Each LED can be directed at a side of the diffuser 22. The LEDs are not shown in FIG. 11, but would be located at a position referenced at 38.

The LEDs, such as LEDs 26, 126, 226, can be driven by the drivers 28, 128. The drivers 28, 128 can include circuitry to driver the LEDs and can be arranged on a relatively long and narrow circuit board. The drivers 28, 128 can be disposed in troughs defined by the members 34, 134. It is noted that the cross-section of the members 32, 132 is substantially similar to the cross-section of the members 34, 134, however the cross-section of the exemplary members 34, 134 does not include a wall 40 referenced in FIG. 11. The trough of the members 34, 134 is the trough 42 of the member 132 that is referenced in FIG. 11.

The back cover 30 can be affixed to the members 32, 34, 132, 134 of the frame 20 with fasteners. The fasteners can extend through apertures in the back cover 30, such as aperture 44. The fasteners 44 can form threads in the space between two walls in the members 32, 34, 132, 134. These walls in member 132 are referenced at 46 and 48 in FIG. 11. The back cover 30 can rest on the walls 46, 48 of the member 132 and similar walls of the members 32, 34, 134. The back cover 30 can also rest on the wall 40 of the member 132 and a similar wall of the member 32.

The lighting arrangement can also include a connecting member. The connecting member can be fixedly engaged on at least one of the light panel 14 and the bracket 12. In the exemplary embodiment, the connecting member is fixed to the light panel 14, but could in other embodiments be fixed to the bracket 12. "Fixedly engaged" can be defined as being attached to a structure (such as the light panel 14 and the bracket 12) through fasteners or snap-lock features or as being integrally-formed with the structure. "Integrally-formed" refers to two or more components that are formed together at the same time, such as in a mold or a press, rather than being formed separately and then subsequently joined. The term defines a structural feature since structures that are integrally-formed are structurally different than structures that are comprised of subcomponents formed separately and then subsequently joined. "Integral" means consisting or composed of parts that together constitute a whole and thus encompasses structures of more than one part wherein the parts are either integrally-formed or formed separately and then subsequently joined. The connecting member can be configured to interconnect the light panel 14 and the bracket 12. The connecting member can be configured to accumulate energy during movement of the frame 20 along the first path of movement wherein the accumulated energy is at least partially released upon the light panel 14 reaching the second position. It is noted that in various embodiments of the present disclosure all of the accumulated energy can be released or less than all of the accumulated energy can be released when the light panel 14 reaches the second position.

In the exemplary embodiment of the present disclosure, the connecting member takes the form of any one of a plurality of clips 50, 150, 250, 350. Each of the exemplary clips 50, 150, 250, 350 is mounted on the back cover 30 which is fixedly engaged with the frame 20. The exemplary clips 50 and 150 are mirror images of the clips 250 and 350. Each of the exemplary clips 50, 150, 250, 350 is generally shaped similarly, as shown in the drawings. The clip 50 will be described in greater detail and the description is also accurate with respect to the other clips 150, 250, 350.

Figure 15:
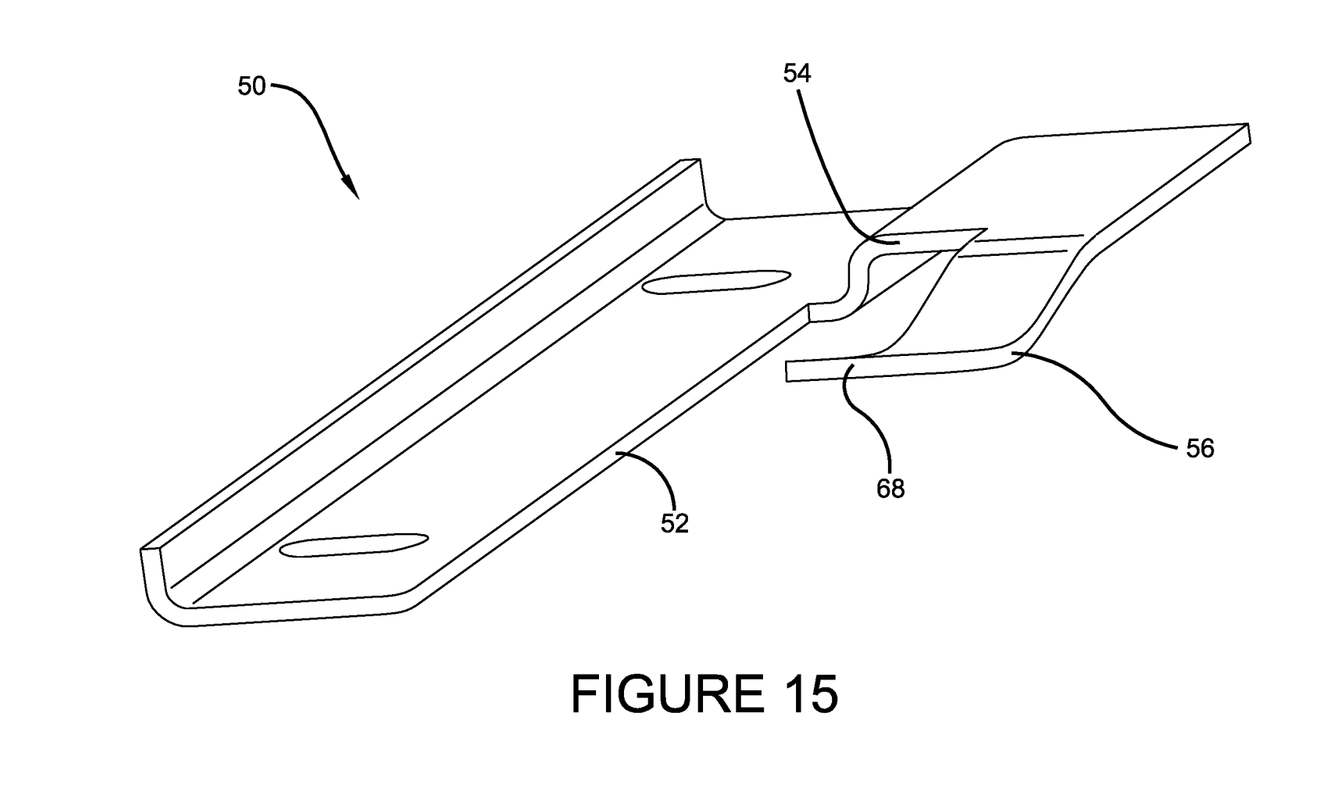
FIG. 15 is a perspective view of a connecting member according to one or more embodiments of the present disclosure.

As best shown in FIG. 15, the exemplary clip 50 includes a plate portion 52 that is flush with the back cover 30. The exemplary clip 50 also includes an arm portion 54 that extends from the plate portion 52 and extends away from the back cover 30. The exemplary arm portion 54 extends from a first plane of the plate portion 52 to a second plane spaced from and parallel to the first plane. The exemplary arm portion 54 extends in an s-shaped profile. The exemplary clip 50 also includes a biasing portion 56 that extends from the arm portion 54. The arm portion 54 extends away from the plate portion 52 laterally and the biasing portion 56 extends away from the arm portion 54 laterally. The exemplary biasing portion 56 extends in a bowl-shaped profile to a distal end 68.

The lighting arrangement 10 includes a retaining member fixedly engaged with one of the light panel 14 and the bracket 12. The retaining member is fixedly engaged with the structure opposite to the connecting member. Thus, in the exemplary embodiment, the retaining member is fixedly engaged with the bracket 12 while the connecting member is fixedly engaged with the light panel 14. The retaining member is configured to engage the connecting member during the movement of the frame 20 along the first path of movement for interconnecting the light panel 14 and the bracket 12.

In the exemplary embodiment of the present disclosure, the spans 18, 118 define retaining members. Thus, in the exemplary embodiment, both the connecting member and the retaining member are cantilevered arms. The connecting member 50 includes arm portion 54 cantilevered off the back cover 30 and the retaining member 18 is cantilevered off the spine 16 and/or the ceiling or wall.

One end of the exemplary span 18 will now be described in greater detail and the description is also accurate with respect to the other end of the exemplary span 18 as well as both ends of the exemplary span 118. As best shown in FIG. 11, the span 18 extends along a non-straight path and defines an upwardly facing channel referenced at 58 and a downwardly facing channel referenced at 60, with a wall portion 62 shared by both channels 58 and 60. The span 18 also includes a post 64 projecting from the bottom wall portion of the channel 58. The span 18 also includes a down-turned lip 66 at its distal end.

Figure 1:
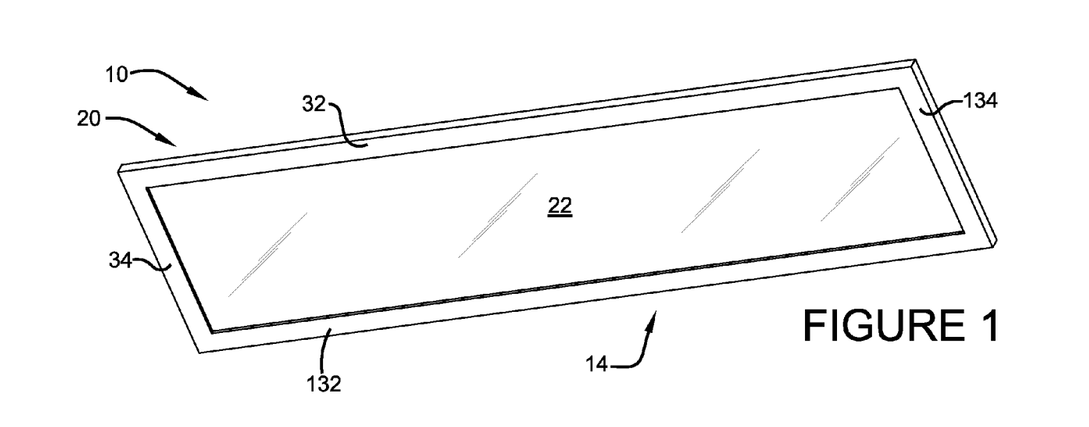
FIG. 1 is a perspective view a lighting arrangement according to an exemplary embodiment of the present disclosure wherein the point of perspective is the underside of the lighting arrangement from which light will be emitted.
Figure 2:
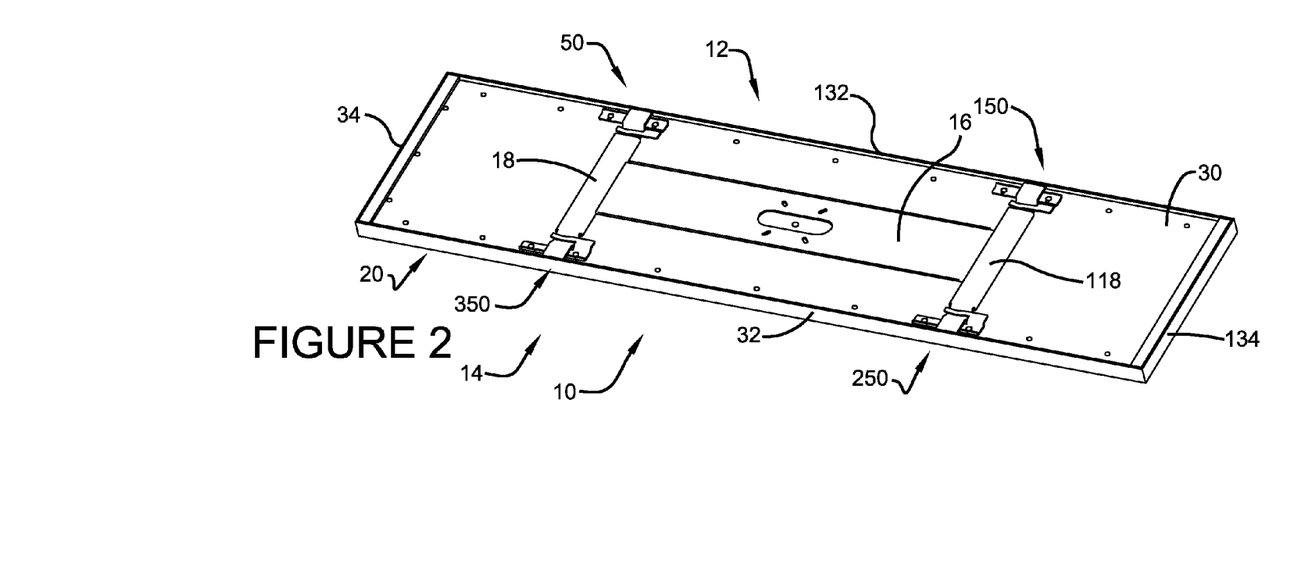
FIG. 2 is a perspective view the exemplary lighting arrangement wherein the point of perspective is the top side of the lighting arrangement opposite to the underside from which light will be emitted.
Figure 3:
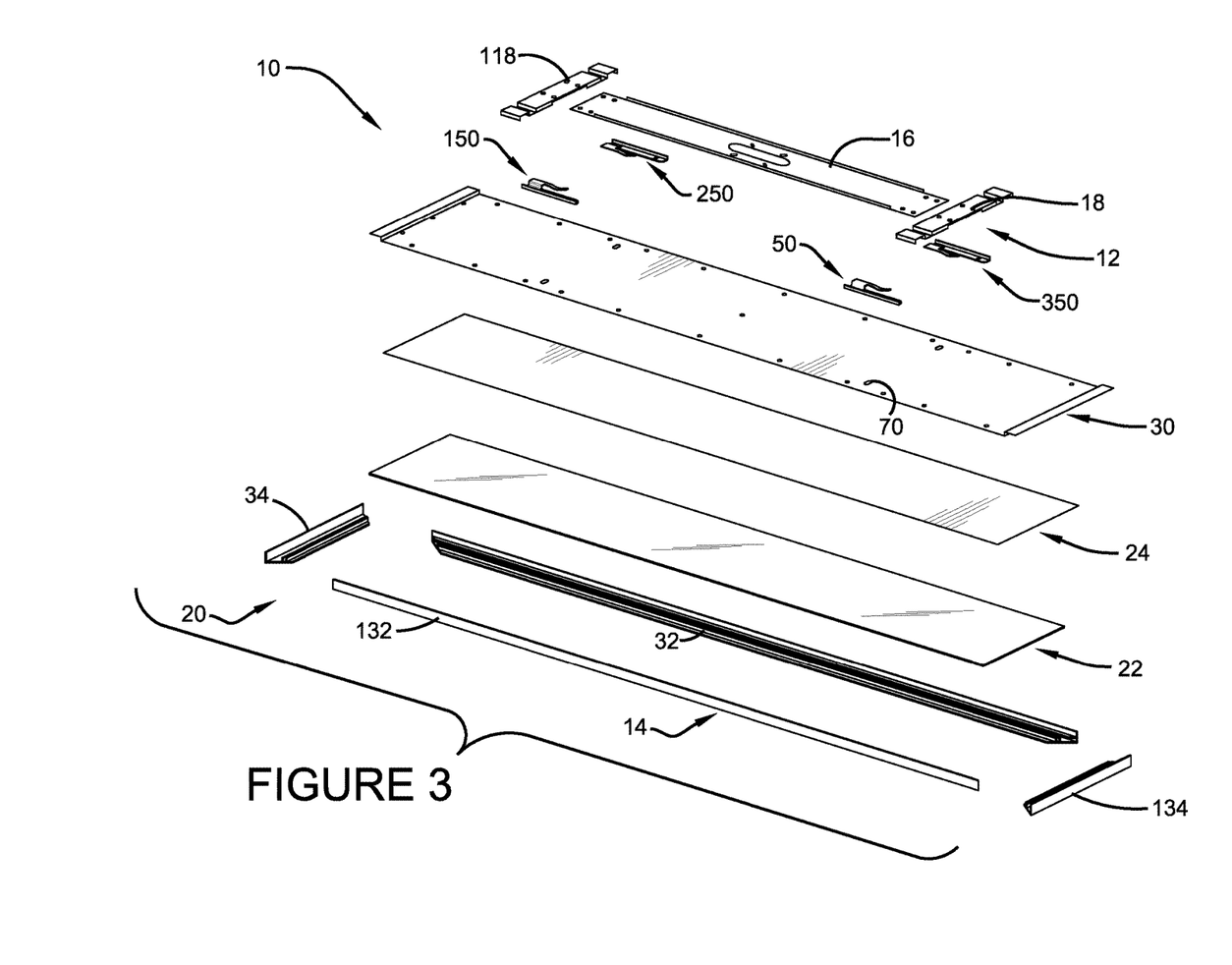
FIG. 3 is an exploded view of the exemplary lighting arrangement.
Figure 4:
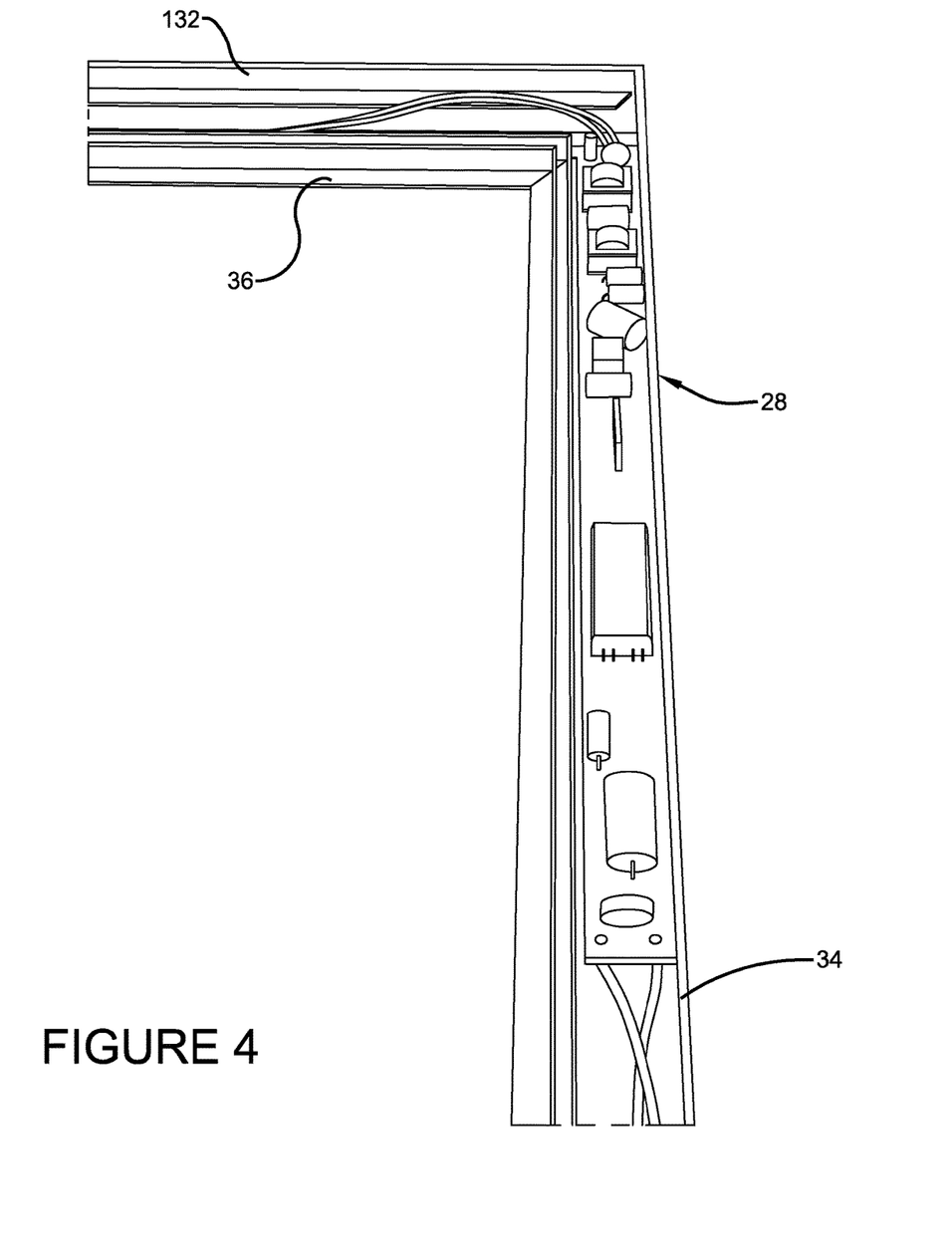
FIG. 4 is a perspective view of a portion of a frame of the exemplary lighting arrangement with a linear driver disposed in the frame.
Figure 5:
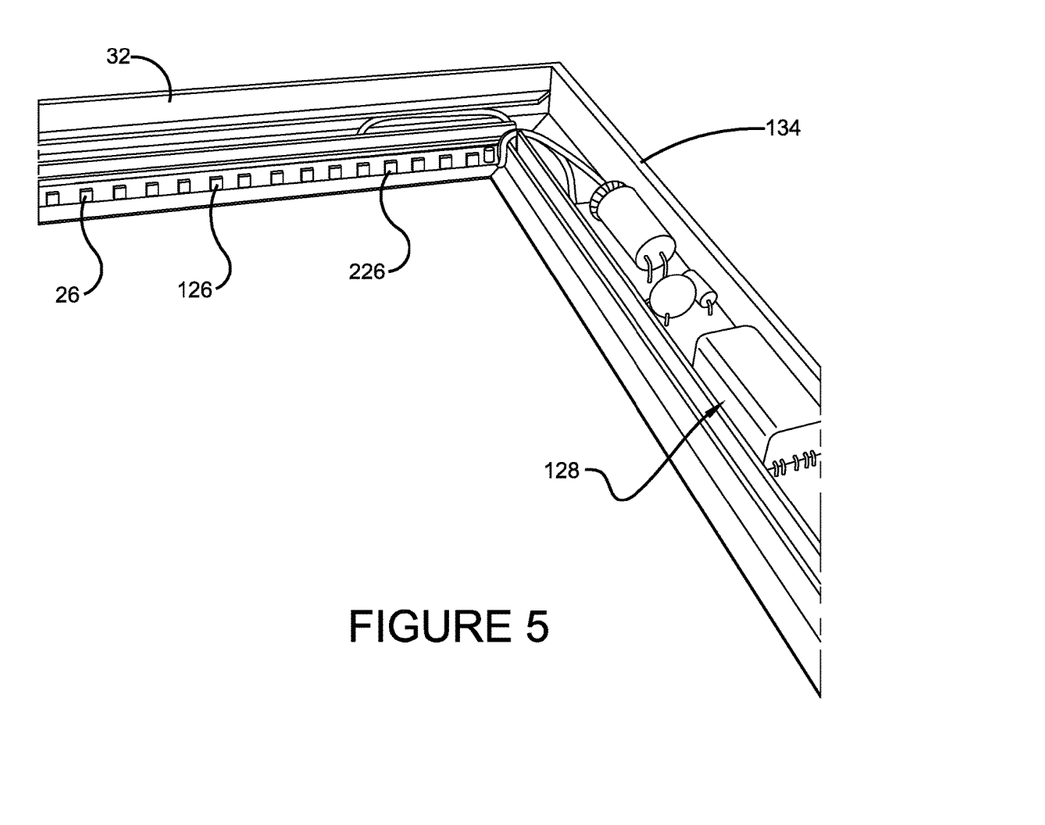
FIG. 5 is a perspective view of a portion of a frame of the exemplary lighting arrangement with the linear driver disposed in the frame and a portion of an array of light emitting diodes supported on the frame.
Figure 6:
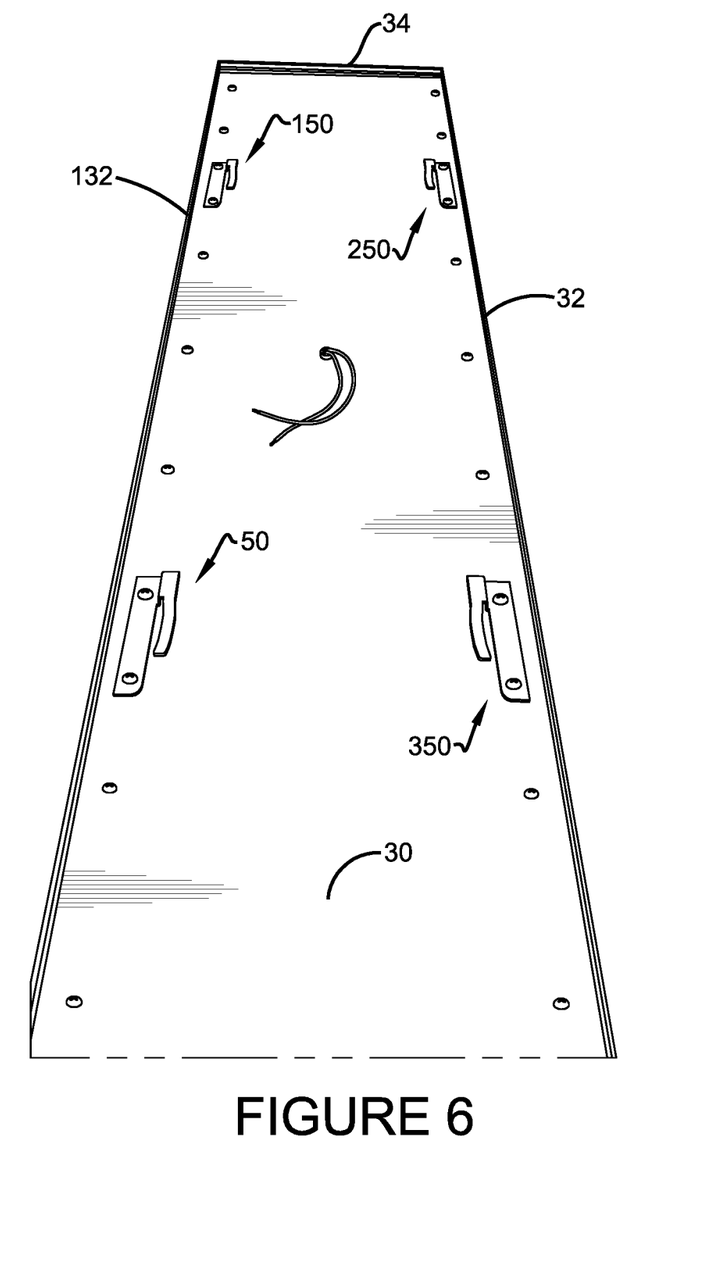
FIG. 6 is a rear perspective view of a light emitter portion of the exemplary lighting arrangement with wiring ready for connection to a power source.
Figure 7:
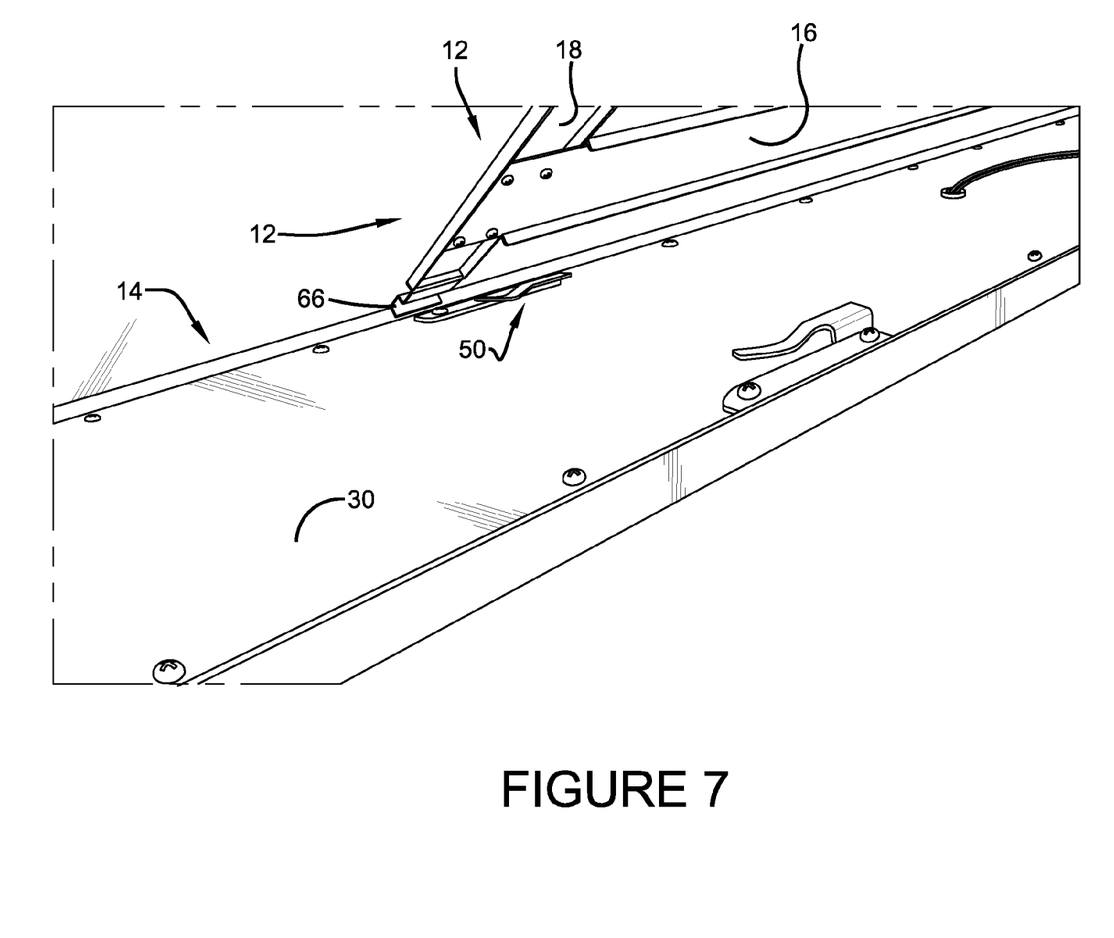
FIG. 7 is a perspective view taken during the assembly of the light panel with a mounting bracket mounted to a ceiling.

During assembly of the lighting arrangement 10, the bracket 12 can be mounted to the desired surface, such as a ceiling or wall. An outer wall of one of the members 32, 132 can be positioned flush with a down-turned lips of the spans 18, 118, such as the lip 66. This is shown in FIG. 7. In FIG. 7, the light panel 14 is tilted relative to the bracket 12 to allow the observer to see initial alignment of one of the connecting members and one of the retaining members. Next, the light panel 14 can be moved longitudinally and rectilinearly relative to the bracket 12 along the first path of movement. The plate portions of the clips 50, 150, 250, 350 can be directed through downwardly-facing channels of the spans 18, 118. For example, the plate portion 52 can be received in the downwardly-facing channel 60 to guide movement of the light panel 14.

As the light panel 14 is further moved longitudinally relative to the bracket 12, distal ends the biasing portions of the clips 50, 150, 250, 350 move adjacent to the upwardly-facing channels of the spans 18, 118. For example, the distal end 68 can come into contact with the upwardly-facing channel 58. This is shown in FIG. 12.

As the light panel 14 is further moved longitudinally relative to the bracket 12, the biasing portions of the clips 50, 150, 250, 350 are elastically deflected over the spans 18, 118 and slide across the bottom surface of the upwardly-facing channels of the spans 18, 118. For example, the biasing portion 56 can slide across the bottom surface of the upwardly-facing channel 58. This is shown in FIG. 13.

Thus, in the exemplary embodiment, at least part of the connecting member (the biasing portion 56) contacts the retaining member (span 18) during the movement of the frame 20 along the first path of movement in the first direction and is elastically deformed against the retaining member during the movement of the frame along the first path of movement in the first direction to accumulate the potential energy.

Thus, in the exemplary embodiment, the retaining member and the connecting member engage one another in a cam-cam follower relationship. The retaining member (span 18) is spatially fixed during the movement of the frame 20 along the first path of movement in the first direction. The movement of at least a portion of the connecting member (the biasing portion 56) is diverted by the retaining member. The biasing portion 56 is forced upward by the spatially-fixed span 18.

The biasing portion 56 is under elastic deformation or deflection as it slides across the bottom surface of the upwardly-facing channel 58. This deflection results in the accumulation of energy. This deflection also results in the light panel 14 being urged upward, toward the bracket 12, when the energy is released. During movement along the first path prior to the light panel 14 reaching the second position, the post 64 is sliding across the upwardly-facing surface of the back cover 30 and prevents the light panel 14 from moving upward. This allows the light emitter to move longitudinally across the desired surface (ceiling or wall) with scuffing or marring the desired surface. The height of the post 64 can be selected as desired. It has been found that a height of two millimeters will be sufficient for at least some surfaces, such as a ceiling covered with a "popcorn" material.

As the light panel 14 is further moved longitudinally relative to the bracket 12, apertures in the back cover 30 come into alignment with posts of the spans 18, 118. For example, the post 64 can come into alignment with an aperture 70 in the back cover 30. When this alignment occurs, the energy accumulated by deflection of the biasing portions results in the posts moving into the apertures and thereby in the light panel 14 being moved upward. This is shown in FIG. 14.

The exemplary lighting arrangement 10 thus includes first and second release members that can be complementary to one another. In the exemplary embodiment of the present disclosure, a first release member is defined by the post 64 and the second release member is defined by the aperture 70. One of the exemplary first and second release members is fixedly engaged with the light panel 14 and the other of the first and second release members fixedly engaged with the bracket 12. The exemplary first release member 64 is integrally formed with the retaining member 18. The first and second release members are unaligned with one another the light panel is at the first position along the first path of movement, as shown in FIG. 12. The first and second release members are unaligned with one another when the connecting member first contacts the retaining member as the light panel moves along the first path of movement, as shown in FIG. 12. The first and second release members are aligned with one another when the light panel is at the second position along the first path of movement, as shown in FIG. 14. The first release member is received in the second release member when the light panel 14 reaches the second position during the movement along the first path of movement. The exemplary first and second release members are thus complementary, working together to allow for the release of the energy accumulated in the biasing portion 56.

Figure 9:
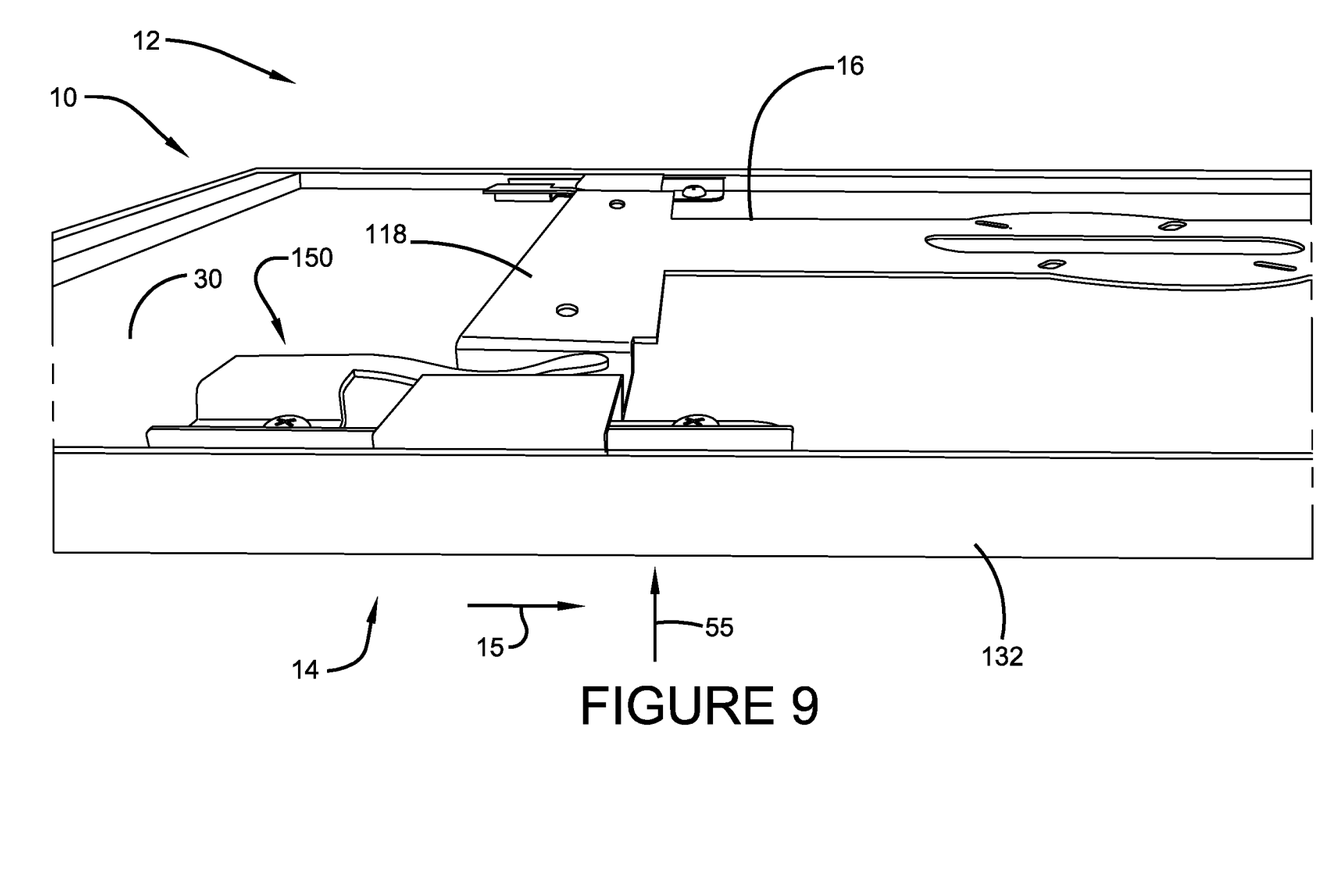
FIG. 9 is a second perspective view of a portion of the top side of the exemplary lighting arrangement with the bracket and light panel coming together for interconnection, wherein the bracket and light panel are shown coming together for interconnection and are closer to full engagement than the relative positions shown in FIG. 8.

As set forth above, the exemplary first release member (post 64) prevents the light panel 14 from moving closer to the bracket 12 during the movement of the light panel 14 along the first path of movement from the first position prior to the light panel 14 reaching the second position. The biasing portion 56 releases at least a portion of the accumulated energy in response to alignment of the first and second complementary release members. In response to release of at least a portion the energy accumulated by the connecting members 50, 150, 250, 350 (individually and/or collectively) at the second position along the first path, the light panel 14 moves along a second path different than the first path. The exemplary second path of movement is referenced at 55 and is transverse to the first path, as shown in FIGS. 8, 9 and 14. The exemplary second path of movement is perpendicular to the exemplary first path; the second path is vertical and the first path is horizontal. The light panel 14 thus moves closer to the bracket 12 during the movement along the second path. The extent of vertical movement of the light panel 14 along the second path 55 is referenced at 57 in FIG. 12. As shown in FIG. 14, the connecting member (through the biasing portion 56), the retaining member 18, the first release member 64, and the second release member 70 are aligned along a common axis 59 when the light panel 14 is in the second position.

The exemplary connecting members 50, 150, 250, 350 are each unitary structures directly engaging one of the retaining members 18, 118 during the movement of the frame 20 along the first path of movement in the first direction. Each of the exemplary connecting members 50, 150, 250, 350 elastically deform in response to the engagement with the respective retaining member 18, 118. In alternative embodiments of the present disclosure, the connecting member can be bifurcated to include a first structure that engages the retaining member and a second structure that is deformed in response to the first structure's engagement with the retaining member. For example, a shaft could be such a first structure and a spring surrounding the shaft could be the second structure.

As shown by FIGS. 11 and 14, at least a portion of the retaining member (the upwardly-facing channel 58) is positioned between at least a portion of the connecting member (the biasing portion 56) and the light panel 14 when the light panel 14 is in the second position along the first path of movement. In the exemplary embodiment, the light panel 14 rests on the retaining members 18, 118 through the connecting members 50, 150, 250, 350 when the light panel 14 is in the second position along the first path of movement.

In the exemplary embodiment, the frame 20 of the light panel 14 and the bracket 12 are selectively disengageable from one another after being engaged with one another. The light panel 14 can be pulled downwardly and then moved horizontally to disengage the connecting members 50, 150, 250, 350 from the retaining members 18, 118. "Selectively disengageable" refers to the fact that in the exemplary embodiment the light panel 14 can be mounted on the bracket 12 and can be removed without damage to the light panel 14 or the bracket 12 and can be re-attached again.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other present disclosures in other patent documents is hereby unconditionally reserved.

What is claimed is:

1. A lighting arrangement comprising:
   a light panel including a frame and a plurality of light emitting units mounted on said frame;
   a bracket mountable on at least one of a wall and a ceiling, said frame of said light panel and said bracket selectively engageable with one another through one of rectilinear movement and rotational movement of said light panel relative to said bracket along a first path of movement in a first direction between a first position and a second position;
   a connecting member fixedly engaged with at least one of said light panel and said bracket, said connecting member configured to interconnect said light panel and said bracket, said connecting member configured to accumulate energy during movement of said frame along said first path of movement wherein the accumulated energy is at least partially released upon said light panel reaching said second position; and
   first and second release members complementary to one another, one of said first and second release members fixedly engaged with said light panel and the other of said first and second release members fixedly engaged with said bracket, said first and second release members unaligned with one another said light panel is at said first position along said first path of movement, said first and second release members aligned with one another when said light panel is at said second position along said first path of movement, said first release member received in said second release member when said light panel reaches said second position during the movement along said first path of movement.

2. The lighting arrangement of claim 1 wherein one said first and second release members prevents said light panel from moving closer to said bracket during the movement of said light panel along said first path of movement from said first position prior to said light panel reaching said second position.

3. The lighting arrangement of claim 1 wherein said connecting member releases at least a portion of the accumulated energy in response to alignment of said first and second complementary release members.

4. The lighting arrangement of claim 1 wherein said first release member is further defined as a post and said second release member is further defined as an aperture.

5. The lighting arrangement of claim 1 wherein said frame of said light panel and said bracket are selectively disengageable from one another after being engaged with one another.

6. The lighting arrangement of claim 1 wherein a portion of the light panel contacts and slides across a portion of said bracket during the movement along said first path.

7. A lighting arrangement comprising:
   a light panel including a frame and a plurality of light emitting units mounted on said frame;
   a bracket mountable on at least one of a wall and a ceiling, said frame of said light panel and said bracket selectively engageable with one another through one of rectilinear movement and rotational movement of said light panel relative to said bracket along a first path of movement in a first direction between a first position and a second position;
   a connecting member fixedly engaged with at least one of said light panel and said bracket, said connecting member configured to interconnect said light panel and said bracket, said connecting member configured to accumulate energy during movement of said frame along said first path of movement wherein the accumulated energy is at least partially released upon said light panel reaching said second position; and
   wherein said light panel moves along a second path different than said first path in response to release of at least a portion of the energy accumulated by the connecting member at said second position along said first path.

8. The lighting arrangement of claim 7 further comprising:
   a retaining member fixedly engaged with the other of the at least one of said light panel and said bracket opposite said connecting member, said retaining member configured to engage said connecting member during the movement of said frame along said first path of movement for interconnecting said light panel and said bracket.

9. The lighting arrangement of claim 8 wherein at least part of said connecting member contacts said retaining member during the movement of said frame along said first path of movement in said first direction and is elastically deformed against said retaining member during the movement of said frame along said first path of movement in said first direction to accumulate the potential energy.

10. The lighting arrangement of claim 8 wherein said retaining member and said connecting member engage one another in a cam—cam follower relationship such that said retaining member is spatially fixed during the movement of said frame along said first path of movement in said first direction and movement of at least a portion of said connecting member is diverted by said retaining member.

11. The lighting arrangement of claim 8 wherein at least a portion of said retaining member is positioned between at least a portion of said connecting member and said light panel when said light panel is in said second position along said first path of movement.

12. The lighting arrangement of claim 8 wherein said light panel rests on said retaining member through said connecting member when said light panel is in said second position along said first path of movement.

13. The lighting arrangement of claim 8 wherein said connecting member and said retaining member are both further defined as cantilevered arms.

14. The lighting arrangement of claim 7 wherein said second path of movement is transverse to said first path.

15. The lighting arrangement of claim 7 wherein said light panel moves closer to said bracket during the movement along said second path.

16. The lighting arrangement of claim 14 wherein said second path of movement is perpendicular to said first path.

17. A lighting arrangement comprising:
a light panel including a frame and a plurality of light emitting units mounted on said frame;
a bracket mountable on at least one of a wall and a ceiling, said frame of said light panel and said bracket selectively engageable with one another through one of rectilinear movement and rotational movement of said light panel relative to said bracket along a first path of movement in a first direction between a first position and a second position;
a connecting member fixedly engaged with at least one of said light panel and said bracket, said connecting member configured to interconnect said light panel and said bracket, said connecting member configured to accumulate energy during movement of said frame along said first path of movement wherein the accumulated energy is at least partially released upon said light panel reaching said second position;
a retaining member fixedly engaged with the other of the at least one of said light panel and said bracket opposite said connecting member, said retaining member configured to engage said connecting member during the movement of said frame along said first path of movement for interconnecting said light panel and said bracket; and
first and second release members, one of said first and second release members fixedly engaged with said light panel and the other of said first and second release members fixedly engaged with said bracket, said first and second release members unaligned with one another when said connecting member first contacts said retaining member as said light panel moves along said first path of movement, said first and second release members aligned with one another when said light panel is at said second position along said first path of movement, said first release member received in said second release member when said light panel reaches said second position during the movement along said first path of movement.

18. The lighting arrangement of claim 17 wherein said connecting member and said retaining member and said first release member and said second release member are aligned along a common axis when said light panel is in said second position.

19. The lighting arrangement of claim 17 wherein at least one of said first release member and said second release member is integrally formed with one of said connecting member and said retaining member.

20. The lighting arrangement of claim 17 wherein said connecting member is further defined as a unitary structure directly engaging said retaining member during the movement of said frame along said first path of movement in said first direction and elastically deforming in response to the engagement with said retaining member.

* * * * *